US011327542B2

(12) United States Patent
Kita (10) Patent No.: US 11,327,542 B2
(45) Date of Patent: May 10, 2022

(54) CONTROL DEVICE, CONTROL METHOD, AND RECORDING MEDIUM

(71) Applicant: Casio Computer Co., Ltd., Tokyo (JP)

(72) Inventor: Kazunori Kita, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 149 days.

(21) Appl. No.: 16/597,017

(22) Filed: Oct. 9, 2019

(65) Prior Publication Data

US 2020/0117259 A1 Apr. 16, 2020

(30) Foreign Application Priority Data

Oct. 12, 2018 (JP) .............................. JP2018-193070

(51) Int. Cl.
*G06F 1/28* (2006.01)
*G04C 10/04* (2006.01)
*G04C 10/02* (2006.01)

(52) U.S. Cl.
CPC .............. *G06F 1/28* (2013.01); *G04C 10/02* (2013.01); *G04C 10/04* (2013.01)

(58) Field of Classification Search
CPC .................................. G06F 1/28; G04C 10/02
USPC ........................................................ 700/291
See application file for complete search history.

(56) References Cited

U.S. PATENT DOCUMENTS

| 9,874,923 | B1* | 1/2018 | Brown | G06F 1/26 |
| 2008/0201587 | A1* | 8/2008 | Lee | G06F 1/329 |
| | | | | 713/320 |
| 2014/0236366 | A1* | 8/2014 | Livadaras | H02J 13/0006 |
| | | | | 700/286 |
| 2015/0091704 | A1* | 4/2015 | Zhao | G06K 19/0723 |
| | | | | 340/10.5 |
| 2016/0172873 | A1* | 6/2016 | Hall | G08B 17/00 |
| | | | | 307/20 |
| 2017/0288415 | A1* | 10/2017 | Vaidya | H01L 41/1136 |
| 2019/0018472 | A1* | 1/2019 | Elboim | G06F 1/3212 |
| 2019/0020290 | A1* | 1/2019 | Feng | H02J 7/34 |

FOREIGN PATENT DOCUMENTS

| JP | 2000-353295 A | 12/2000 |
| JP | 2011-205801 A | 10/2011 |
| JP | 2012-228141 A | 11/2012 |

* cited by examiner

*Primary Examiner* — Robert A Cassity
(74) *Attorney, Agent, or Firm* — Seed IP Law Group LLP (57) ABSTRACT

There is provided a control device that includes a processor and an energy harvesting unit. The processor acquires an electricity consumption amount necessary for execution of a predetermined function of the processor and an amount of energy harvested by the energy harvesting unit, and determines whether or not to execute the predetermined function based on the electricity consumption amount, the amount of energy harvested that are acquired.

16 Claims, 4 Drawing Sheets

FIG.1

CONTROL DEVICE, CONTROL METHOD, AND RECORDING MEDIUM

BACKGROUND

The technical field relates to a control device, a control method, and a recording medium.

Conventionally, there have been route guidance devices for vehicles which, in a case where the terminal voltage of a battery for storing electricity from a photovoltaic cell gets low, redo a search for a route to get a larger amount of solar radiation and guide a vehicle accordingly (for example, see Japanese Patent Application Laid-Open Publication No. 2000-353295).

SUMMARY

A control device, a control method, and a recording medium are disclosed.

According to one aspect of the present invention, there is provided a control device, including:

a processor; and an energy harvesting unit, wherein the processor acquires an electricity consumption amount necessary for execution of a predetermined function of the processor and an amount of energy harvested by the energy harvesting unit, and determines whether or not to execute the predetermined function based on the electricity consumption amount, the amount of energy harvested that are acquired.

DETAILED DESCRIPTION

Hereinafter, some embodiments of the control device, the control method, and the storage medium are described with reference to the drawings.

First Embodiment

<Schematic Configuration of Electronic Device 100>

An electronic device 100 in the present embodiment includes an energy harvesting unit 14 which can convert a little energy in a daily life into electric power for use. Hereinafter, a wrist-watch type smartwatch is described as an example of the electronic device 100.

Figure 1:
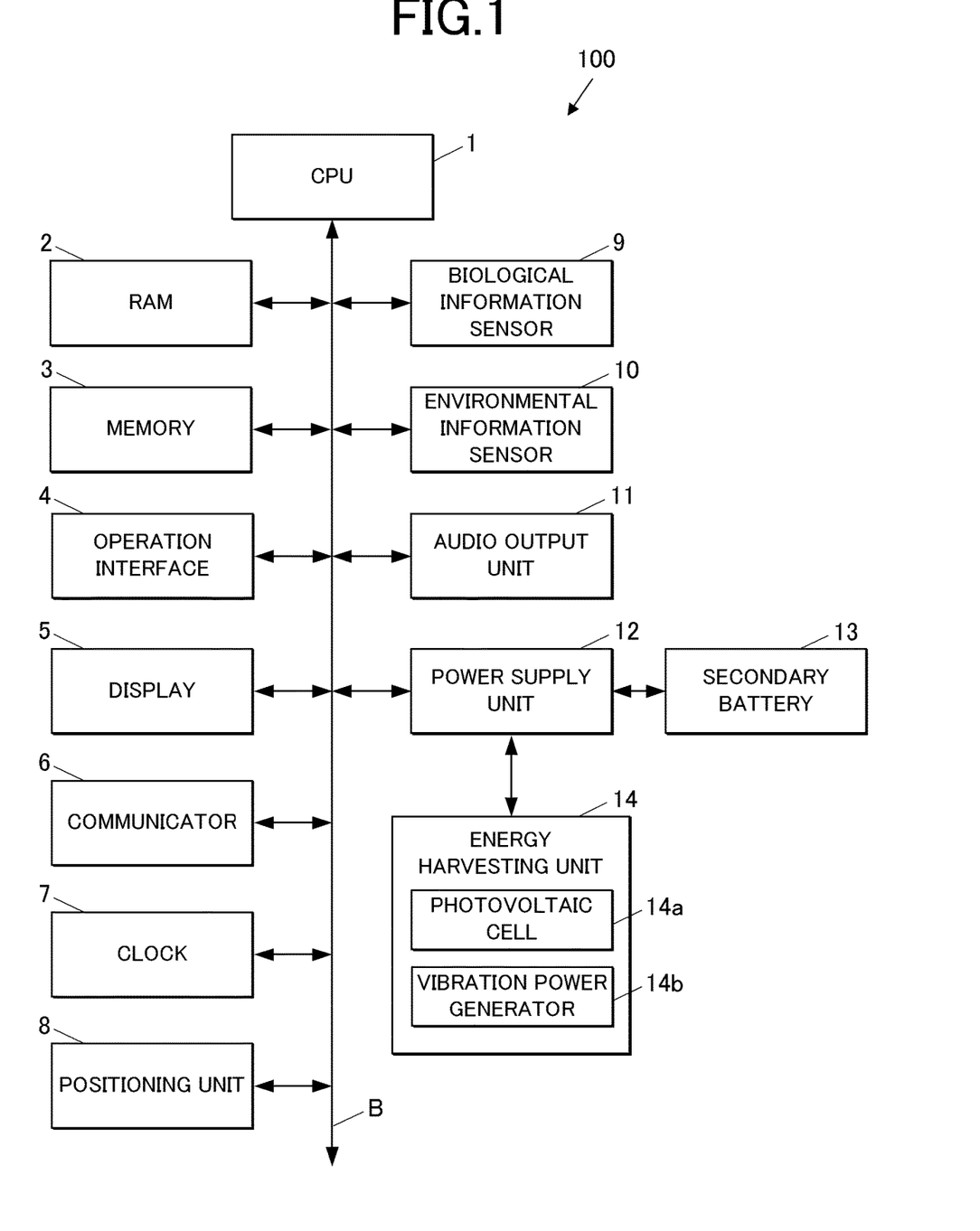
FIG. 1 is a block diagram of a functional configuration of an electronic device in one or more embodiments.

FIG. 1 is a block diagram of a schematic configuration of the electronic device 100 in one or more embodiments according to the present invention.

As shown in FIG. 1, the electronic device 100 includes a CPU (Central Processing Unit) 1, a RAM (Random Access Memory) 2, a memory 3, an operation interface 4, a display 5, a communicator 6, a clock 7, a positioning unit 8, a biological information sensor 9, an environmental information sensor 10, an audio output unit 11, a power supply unit 12, a secondary battery 13, and the energy harvesting unit 14. These components of the electronic device 100 are connected with each other via a bus B.

The CPU 1 reads out various programs such as a system program and an application program which are stored in the memory 3 according to control signals input from the operation interface 4, loads them in a work area of the RAM 2, and executes the various programs properly.

The RAM 2 is a volatile memory, for example, and includes the work area which temporarily stores various kinds of the programs and data read out by the CPU 1.

The memory 3 is configured as a flash memory, for example. The memory 3 stores various kinds of the programs (for example, a system program, an application program, etc.) executed by the CPU 1, the data (including a data log (described later)) necessary for execution of such programs, etc.

The operation interface 4 includes, for example, a power button to turn the power of the electronic device 100 on or off, up, down, left, and right cursor buttons, and an enter button. In response to a button operation, the operation interface 4 outputs to the CPU 1 an operation command according to the button operation.

The operation interface 4 may include a touch panel integrally formed with the display 5 and output to the CPU 1 an operation command according to a predetermined operation in response to the predetermined user operation on the touch panel.

The display 5 is configured as an LCD (Liquid Crystal Display) or an organic EL display, for example. Various kinds of screens, such as a screen showing the remaining battery level of the electronic device 100 and an operation screen for a user to input instructions such as start or end of a desired application program, are displayed on the display 5 according to display signals output by the CPU 1.

The communicator 6 is an interface for data communication with external devices wirelessly. Specifically, the communicator 6 includes an antenna, a modulation/demodulation circuit, a signal processing circuit, etc., for example, to communicate using standard techniques such as Bluetooth (Registered Trademark), Wi-Fi (Registered Trademark), etc.

The clock 7, which includes a clock circuit inside, measures the current date and time (including the day of the week), and outputs it as the current time information (date and time data).

The positioning unit 8 measures the present position (latitude, longitude, altitude) of the electronic device 100. A GNSS (Global Navigation Satellite System) receptor which can receive predetermined information from a satellite positioning system is used as the positioning unit 8. The positioning unit 8 outputs to the CPU 1 positioning data showing the present position, etc. of the electronic device 100 at predetermined intervals (for example, one minute).

The biological information sensor 9 includes various kinds of sensors which can detect biological information such as the temperature, the electrocardiogram, the heart rate, and the pulse of the user and outputs the measurement results to the CPU 1.

The environmental sensor 10 includes a motion sensor such as a 3-axis acceleration sensor, a gyro sensor, and a geomagnetic sensor which can detect the movement of the electronic device 100, and a thermometer/hygrometer, a barometer/altimeter, a photometer, etc. which can acquire the environmental information around the electronic device 100, and outputs the measurement results to the CPU 1.

The audio output unit 11 includes a DA converter, an amplifier, a speaker, etc. The audio output unit 11 converts audio data into analog audio data at the time of audio output and outputs the audio signals via the speaker.

The power supply unit 12 stores electric power to be used for the operation of each component of the electronic device 100 in the secondary battery 13 and outputs it.

The secondary battery 13 is a rechargeable battery which can output stored electricity and is a lithium ion battery, for example.

The energy harvesting unit 14 rectifies electric power which is acquired by electricity generation and sends it to the power supply unit 12. The energy harvesting unit 14 includes a photovoltaic cell 14a and a vibration power generator 14b, for example. The photovoltaic cell 14a converts energy of light into electric power using the photovoltaic effect. The vibration power generator 14b converts pressure created by shaking of the electronic device 100 using a piezoelectric element, etc.

<Operation of Electronic Device 100>

Next, the operation of the electronic device 100 in the present embodiment is described.

<Log Recording Processing>

Figure 2:
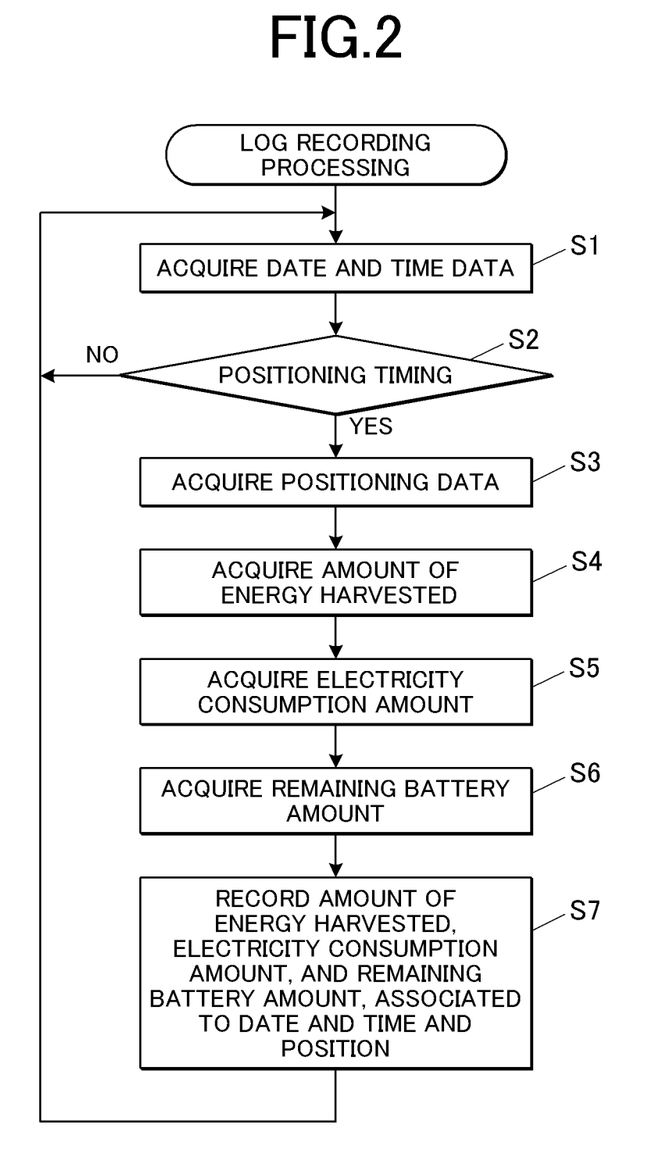
FIG. 2 is a flow chart of log recording processing.

FIG. 2 is a flow chart showing a log recording processing.

As shown in FIG. 2, the CPU 1 of the electronic device 100 first acquires date and time data from the clock 7 (Step S1).

The CPU 1 then determines whether or not the date and time is at a positioning timing to acquire the positioning data from the positioning unit 8 (Step S2).

If the CPU 1 determines that it is not at a positioning timing at Step S2 (Step S2; NO), the CPU 1 returns the process to Step S1, and repeatedly executes the following steps.

On the other hand, if it is at a positioning timing at Step S2 (Step S2; YES), the CPU 1 acquires the positioning data from the positioning unit 8 (Step S3).

Next, the CPU 1 acquires the amount of energy harvested by the energy harvesting unit 14 at the time of acquisition of the date and time data and the positioning data (Step S4). Specifically, the CPU 1 acquires the amount of energy harvested by the photovoltaic cell 14a and the amount of energy harvested by the vibration power generator 14b. The amount of energy harvested by the energy harvesting unit 14 may also be acquired by calculation by the CPU 1. Alternatively, the CPU 1 may acquire the amount of energy harvested by the photo voltaic cell 14a and the vibration power generator 14b from a table stored in the memory 3 which shows the amount of energy harvested by the photovoltaic cell 14a and the vibration power generator 14b, for example.

Next, the CPU 1 acquires the electricity consumption amount of each component of the electronic device 100 at the time of acquisition of the date and time data and the positioning data (Step S5). The electricity consumption amount of each component of the electronic device 100 may also be acquired by calculation by the CPU 1. Alternatively, the CPU 1 may acquire the electricity consumption amount of each component of the electronic device 100 from a table stored in the memory 3 which shows the electricity consumption amount of each function, for example.

Next, the CPU 1 acquires the remaining battery amount (charge level) of the secondary battery 13 at the time of acquisition of the date and time data and the positioning data (Step S6). Alternatively, the remaining battery amount (charge level) of the secondary battery 13 may be acquired by calculation by the CPU 1.

Next, the CPU 1 records the amount of energy harvested, the electricity consumption amount, and the remaining battery amount acquired at Steps S4 to S6, associating them to the date and time indicated by the date and time data and the position indicated by the positioning data (the present position) in the data log in the memory 3 (Step S7). Then, the CPU 1 returns the process to Step S1 after recording on the data log, and repeatedly executes the following steps.

<Function Control Processing>

Figure 3:
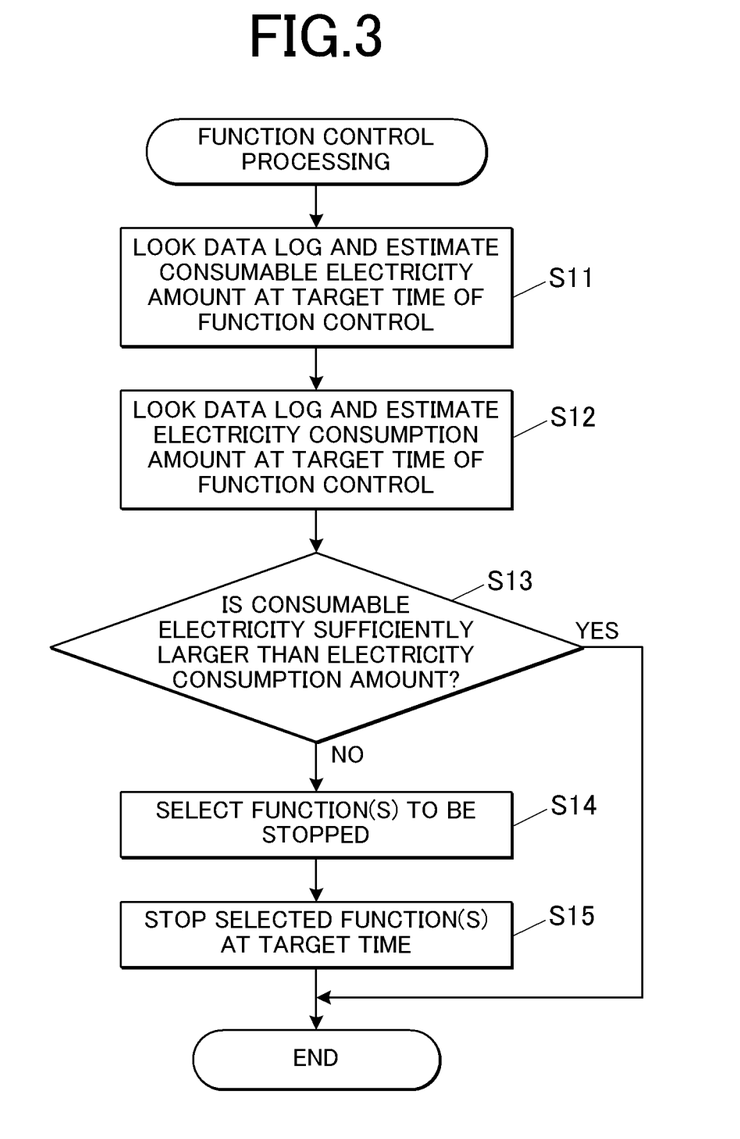
FIG. 3 is a flow chart of function control processing in the first embodiment.

FIG. 3 is a flow chart showing function control processing.

As shown in FIG. 3, the CPU 1 of the electronic device 100 first looks the data log in the memory 3 and estimates the consumable electricity amount at a target time of function control (for example, the current time, the time after several minutes from the current time, the time after several hours from the current time, etc.) (Step S11). For example, in a case where the target time of the function control is the time after several minutes from the current time, the CPU 1 looks the data log in the memory 3, and acquires data on the amount of energy harvested and the remaining battery amount associated to the time after several minutes from the current time and the position at the time after several minutes from the current time. If there is no data on the amount of energy harvested and the remaining battery amount associated to the time after several minutes from the current time and the position at the time after several minutes from the current time here, the CPU 1 acquires data on the amount of energy harvested and the remaining battery amount associated to a date and time and a position which are close to the time after several minutes from the current time and the position at the time after several minutes from the current time. Then, the CPU 1 estimates the consumable electricity amount at the time after several minutes from the current time, which is the sum of the amount of energy harvested and the remaining battery amount at the time after several minutes from the current time, on the basis of the acquired data.

Next, the CPU 1 looks the data log in the memory 3 and estimates the electricity consumption amount at the target time of the function control (for example, the current time, the time after several minutes from the current time, the time after several hours from the current time, etc.) (Step S12). For example, in a case where the target time of the function control is the time after several minutes from the current time, the CPU 1 looks the data log in the memory 3, and acquires data on the electricity consumption amount associated to the time after several minutes from the current time and the position at the time after several minutes from the current time. If there is no data on the electricity consumption amount associated to the time after several minutes from the current time and the position at the time after several minutes from the current time here, the CPU 1 acquires data on the electricity consumption amount associated to a date and time and a position which are close to the time after several minutes from the current time and the position at the time after several minutes from the current time. Then, the CPU 1 estimates the electricity consumption amount at the time after several minutes from the current time on the basis of the acquired data.

Next, the CPU 1 determines whether or not the consumable electricity amount estimated at Step S11 is sufficiently larger than the electricity consumption amount estimated at Step S12 (Step S13). Specifically, if the consumable electricity amount estimated at Step S11 is larger than the electricity amount which is a sum of a predetermined electricity amount and the electricity consumption amount estimated at Step S12, the CPU 1 determines that the consumable electricity amount is sufficiently larger than the electricity consumption amount. On the other hand, if the consumable electricity amount estimated at Step S11 is not larger than the electricity amount which is a sum of the predetermined electricity amount and the electricity consumption amount estimated at Step S12, the CPU 1 determines that the consumable electricity amount is not sufficiently larger than the electricity consumption amount.

If it is determined that the consumable electricity amount is not sufficiently larger than the electricity consumption amount at Step S13 (Step S13; NO), the CPU 1 selects a function(s) to be stopped (for example, a function block, an application program, etc.) after the target time of function control on the basis of the consumable electricity amount and the electricity consumption amount (Step 14).

On the other hand, if it is determined that the consumable electricity amount is sufficiently larger than the electricity consumption amount at Step S13 (Step S13; YES), the CPU ends the function control processing.

Next, the CPU 1 stops the function(s) which the CPU 1 has selected to be stopped at the target time of the function control (Step S15), and then ends the function control processing.

If the CPU 1 selects a function(s) to be stopped at Step S14, the CPU 1 may show message information concerning the selection on the display 5 and prompt the user to manually stop the function(s) that the CPU 1 has selected to be stopped, for example.

At Step S15, the CPU 1 stops the function(s) which the CPU 1 has selected to be stopped at the target time, but alternatively, the CPU 1 may intermittently activate the function(s). As this suspends use of the function(s) temporarily, the electricity consumption can be suppressed.

In addition, at Step S15, the CPU 1 may stop, at the time of selection at Step S14, a function(s) from which appropriate output is not obtained until the use of the function reaches 100% (for example, a function which cannot provide an output even when the use of the function reaches 90%).

As described above, the electronic device 100 in the present embodiment executes multiple predetermined functions, calculates the electricity consumption amount necessary for execution of each function and the amount of energy harvested by the energy harvesting unit 14, and controls the execution of the multiple predetermined functions on the basis of the electricity consumption amount and the amount of energy harvested which are calculated. Thus, the electronic device 100 can control the execution of each function suitably according to the energy harvesting state of the electronic device 100.

The electronic device 100 in the present embodiment calculates the remaining battery amount of the secondary battery 13, and controls the execution of the multiple predetermined functions on the basis of the electricity consumption amount, the amount of energy harvested, and the remaining battery amount which are calculated. Thus, the electronic device 100 can control the execution of each function suitably according not only to the energy harvesting state but also to the electricity storage level of the electronic device 100.

The electronic device 100 in the present embodiment looks the data log of the electricity consumption amount, the amount of energy harvested, the remaining battery amount calculated at each date and time in the past associated to the date and time, estimates the electricity consumption amount, the amount of energy harvested, and the remaining battery amount at a predetermined date and time in the future, and controls the execution of multiple predetermined functions on the basis of the electricity consumption amount, the amount of energy harvested, and the remaining battery amount which are estimated. Thus, the electronic device 100 can control the execution of each function suitably according to the energy harvesting state and the electricity storage state of the electronic device 100 at the predetermined date and time in the future.

The electronic device 100 in the present embodiment looks the data log of the electricity consumption amount, the amount of energy harvested, the remaining battery amount calculated at each location and associated to the location, estimates the electricity consumption amount, the amount of energy harvested, and the remaining battery amount at the predetermined location, and controls the execution of multiple predetermined functions on the basis of the electricity consumption amount, the amount of energy harvested, and the remaining battery amount which are estimated. Thus, the electronic device 100 can control the execution of each function suitably according to the energy harvesting state and the electricity storage state of the electronic device 100 at the predetermined location.

Second Embodiment

Next, the second embodiment is described. The same components as in the first embodiment are labelled with the same reference signs, and descriptions thereof are omitted.

The electronic device 100 in the second embodiment is different from the electronic device 100 in the first embodiment in that schedule information of the user is acquired and that the function control is executed targeting at a scheduled time of a scheduled event according to the acquired schedule information.

<Function Control Processing>

Figure 4:
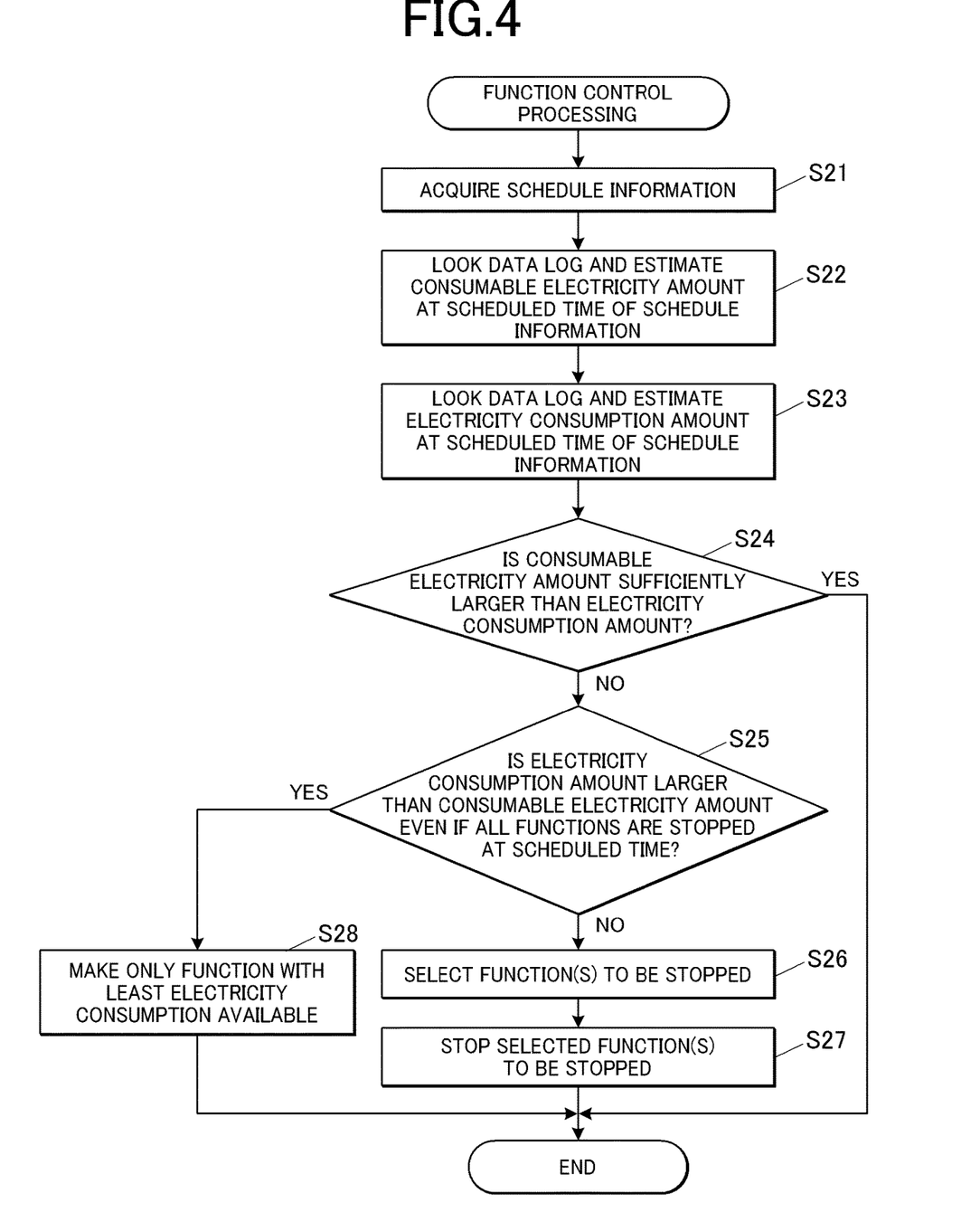
FIG. 4 is a flow chart of function control processing in the second embodiment

FIG. 4 is a flow chart showing the function control processing.

As shown in FIG. 4, the CPU 1 of the electronic device 100 first acquires schedule information of the user from the memory 3 (Step S21). In the embodiment, the schedule information of the user is information which has been appropriately recorded in the memory 3 when a scheduler function (for example, a calendar function, a timetable function, a digital organizer function, a PIM function, etc.) is executed. The schedule information of the user may be stored in an external server device to which the CPU 1 gets access via the communicator 6 to register and update the schedule information and to suitably acquire the schedule information, for example.

Next, the CPU 1 looks the data log in the memory 3, and estimates the consumable electricity amount at the scheduled time in the schedule information of the user (Step S22). Specifically, the CPU 1 looks the data log in the memory 3 and acquires data on the amount of energy harvested and the remaining battery amount associated to the scheduled time and the position at the scheduled time. If there is no data on the amount of energy harvested and the remaining battery amount associated to the scheduled time and the position at the scheduled time, the CPU 1 acquires data on the amount of energy harvested and the remaining battery amount associated to a date and time and a position which are close to the scheduled time and the position at the scheduled time. Then, the CPU 1 estimates the consumable electricity amount at the scheduled time, which is the sum of the amount of energy harvested and the remaining battery amount at the scheduled time, on the basis of the acquired data.

Next, the CPU 1 looks the data log in the memory 3 and estimates the electricity consumption amount at the scheduled time (Step S23). Specifically, the CPU 1 looks the data log in the memory 3 and acquires data on the electricity consumption amount associated to the scheduled time and the position at the scheduled time. If there is no data on the electricity consumption amount associated to the scheduled time and the position at the scheduled time, the CPU 1 acquires data on the electricity consumption amount associated to a date and time and a position which are close to the scheduled time and the position at the scheduled time. Then, the CPU 1 estimates the electricity consumption amount at the scheduled time on the basis of the acquired data on the electricity consumption amount.

Next, the CPU 1 determines whether or not the consumable electricity amount estimated at Step S22 is sufficiently larger than the electricity consumption amount estimated at Step S23 (Step S24).

If it is determined at Step S24 that the consumable electricity amount is not sufficiently larger than the electricity consumption amount (Step S24; NO), the CPU 1 determines whether or not the electricity consumption amount at the scheduled time is larger than the consumable electricity amount at the scheduled time even in a case where all the functions (for example, a function block, an application program, etc.) are stopped at the scheduled time (Step S25).

If it is determined at Step S25 that the electricity consumption amount at the scheduled time is not larger than the consumable electricity amount at the schedule time in a case where all the functions are stopped at the scheduled time (Step S25; NO), the CPU 1 selects a function(s) to be stopped after the scheduled time on the basis of the consumable electricity amount estimated at Step S22 and the electricity consumption amount estimated at Step S23 (Step S26).

Next, the CPU 1 stops the function(s) which the CPU 1 has selected to be stopped at Step S26 (Step S27), and ends the function control processing.

If it is determined at Step S25 that the electricity consumption amount at the scheduled time is larger than the consumable electricity amount at the schedule time even in a case where all the functions are stopped at the scheduled time (Step S25; YES), the CPU 1 executes control that makes only the function(s) with the lowest electric power consumption available till the scheduled time (Step S28), and then ends the function control processing.

If it is determined at Step S24 that the consumable electricity amount is sufficiently larger than the electricity consumption amount (Step S24; YES), the CPU 1 ends the function control processing.

If the CPU 1 selects the function(s) to be stopped at Step S26, the CPU 1 may show message information concerning the selection on the display 5 and prompt the user to manually stop the function(s) which the CPU 1 has selected to be stopped, for example.

At Step S27, the CPU 1 stops using the function(s) which the CPU 1 has selected to be stopped at the scheduled time, but alternatively, the CPU 1 may intermittently activate the function(s). As this suspends use of the function(s) temporarily, the electricity consumption amount can be suppressed.

In addition, at Step S27, the CPU 1 may stop, at the time of selection at Step S26, a function(s) from which appropriate output is not obtained until use of the function reaches 100% (for example, a function which cannot provide an output even when use of the function reaches 90%).

At Step S28, the CPU 1 may execute control that turns on/off each function until the scheduled time according to the predetermined priority of the functions, for example, instead of executing control that allows only the function(s) with the lowest electric power consumption till the scheduled time.

As described above, the electronic device 100 in the present embodiment acquires the schedule information of the user and estimates the electricity consumption amount, the amount of energy harvested, and the remaining battery amount at the date and time of each scheduled event on the basis of the acquired schedule information of the user. Thus, the electronic device 100 can control the execution of each function suitably according to the energy harvesting state and the battery level of the electronic device 100 at the date and time of each scheduled event.

The electronic device 100 in the present embodiment acquires the schedule of the user, and estimates the electricity consumption amount, the amount of energy harvested, and the remaining battery amount at the location where each scheduled event takes place on the basis of the acquired schedule information of the user. Thus, the electronic device 100 can control the execution of each function suitably according to the energy harvesting state and the battery state of the electronic device 100 at the location where each scheduled event takes place.

While some embodiments are described hereinabove, the present invention is not limited to the described embodiments and may be appropriately modified without departing from the scope of the present invention.

For example, in the embodiments described above, the energy harvesting unit 14 includes the photovoltaic cell 14*a* and the vibration power generator 14*b*, though not limited thereto. For example, automatic (self-winding) energy harvesting using a rotatable weight and electronic induction, thermoelectric power generation using thermoelectric elements which converts heat energy into electric energy, energy harvesting in which microwaves are received by a rectenna and converted into electric energy, wireless electric power supply, etc. may be employed.

In the embodiments described above, in the log recording processing (see FIG. 2), the CPU 1 records in the data log in the memory 3 the amount of energy harvested, the electricity consumption amount, and the remaining battery amount, associating them to the date and time and the position (the present position), but the CPU 1 may record the amount of energy harvested, the electricity consumption amount, and the remaining battery amount in respective data logs, for example, such as a data log of the amount of energy harvested, a data log of the electricity consumption amount, and a data log of the remaining battery amount.

In the embodiments described above, the data log is stored in the memory 3, but the data log may be stored in an external server device to which the CPU 1 gets access via the communicator 6 to register and update the data log and to properly acquire the information of the data log, for example.

In the embodiments described above, the consumable electricity amount and the electricity consumption amount are estimated by looking the data log, but the consumable electricity amount and the electricity consumption amount may be estimated on the basis of data which is created by processing the data in the data log. For example, the consumable electricity amount and the electricity consumption amount may be estimated on the basis of a result(s) of statistics on the data in the data log. Alternatively, the consumable electricity amount and the electricity consumption amount may be estimated on the basis of a result(s) of data analytics or machine learning on the data in the data log.

In the embodiments described above, statistics data or prediction data on the amount of energy harvested, the electricity consumption amount, and the remaining battery in a predetermined region at each date and time may be acquired instead of the data log via the communicator 6 from a predetermined server or a service supply system, and the consumable electricity amount and the electricity consumption amount may be estimated on the basis of the acquired data. In this regard, the predetermined region of the statistics data or the predicted data is a divided area which is larger than a position measured by the positioning unit 8. The statistics data and the predicted data are determined by referring to the data log. In the statistics data or the predicted data, the amount of energy harvested, the electricity consumption amount, and the remaining battery amount are graded into multiple levels with respect to each region. Such statistics data or predicted data may be used to select which unit to be used at the target time of the function control or at the scheduled time of the scheduled information from among the photovoltaic cell 14a, the vibration power generator 14b, or a combination thereof.

In the second embodiment described above, the consumable electricity amount and the electricity consumption amount at the scheduled location at the scheduled date and time of the scheduled information are estimated on the basis of the schedule information of the user. However, a behavior recognition means which recognizes user behaviors such as movement states and movement variations and a behavior recording log of the recognized behavior, the position, and the date and time associated to each other may be provided, and a destination or a route of the user may be predicted on the basis of the current date and time, the present location, and the past behavior recording log so as to estimate the consumable electricity amount and the electricity consumption amount at the location and the time of the destination or the route which is predicted. In that case, the behavior recognition means recognizes user behaviors such as movement states and movement variations on the basis of the measurement result(s) of the biological information sensor 9 and the environmental information sensor 10. The electronic device 100 may include an image recording camera, a microphone, etc., and an image(s) recorded by the image recording camera or audio acquired by the microphone may further be used to recognize the user behaviors such as movement states and movement variations.

While some embodiments of the present invention are described hereinabove, the scope of the invention is not limited to the disclosed embodiments and includes the scope of claims below and the scope of their equivalents.

The invention claimed is:

1. A control device, comprising:
a battery;
a processor; and
a memory storing instructions that, when executed by the processor, cause the processor to:
acquire (i) a plurality of electricity consumption amounts required to perform each of a plurality of predetermined functions of the processor, (ii) an amount of energy harvested by at least one device that is electrically coupled to the control device, wherein the electricity consumption amounts and the amount of energy harvested correspond to a predetermined location, and (iii) a remaining battery amount of the battery,
estimate values of the electricity consumption amounts, the amount of energy harvested, and the remaining battery amount at the predetermined location using a data log including values of the electricity consumption amounts, the amount of energy harvested, and the remaining battery amount acquired at each of a plurality of locations and associated with each of the plurality of locations, and
determine whether or not to perform each of the predetermined functions in the predetermined location based on the values of the electricity consumption amounts, the amount of energy harvested, and the remaining battery amount that are estimated.

2. The control device according to claim 1, wherein the instructions, when executed by the processor, cause the processor to:
estimate values of the electricity consumption amounts, the amount of energy harvested, and the remaining battery amount at a predetermined future date and time using a data log including values of the electricity consumption amounts, the amount of energy harvested, and the remaining battery amount acquired at each of a plurality of past dates and times and associated with each of the plurality of past dates and times, and
determine whether or not to perform each of the predetermined functions based on the values of the electricity consumption amounts, the amount of energy harvested, and the remaining battery amount that are estimated.

3. The control device according to claim 2, wherein the instructions, when executed by the processor, cause the processor to:
acquire schedule information of a user, and
estimate values of the electricity consumption amounts, the amount of energy harvested, and the remaining battery amount at a scheduled date and time based on the schedule information.

4. The control device according to claim 1, wherein the instructions, when executed by the processor cause the processor to:
acquire schedule information of a user, and
estimate values of the electricity consumption amounts, the amount of energy harvested, and the remaining battery amount at a scheduled event that takes place in the predetermined location based on the schedule information of the user.

5. The control device according to claim 2,
wherein a plurality of devices is electrically coupled to the control device, and
wherein the instructions, when executed by the processor cause the processor to:
estimate the amount of energy harvested by each of the plurality of devices that is electrically coupled to the control device, and,
when determining whether or not to perform each of the predetermined functions, select one of the plurality of devices that is electrically coupled to the control device based on the estimated amount of energy harvested by each of the plurality of devices that is electrically coupled to the control device.

6. The control device according to claim 3,
wherein a plurality of devices is electrically coupled to the control device, and
wherein the instructions, when executed by the processor cause the processor to:
estimate values of the amount of energy harvested by each of the plurality of devices that is electrically coupled to the control device, and,
when determining whether or not to perform each of the predetermined functions, select one of the plurality of devices that is electrically coupled to the control device to be used based on the values of the amount of energy harvested by each of the plurality of devices that is electrically coupled to the control device.

7. The control device according to claim 1,
wherein a plurality of devices is electrically coupled to the control device, and
wherein the instructions, when executed by the processor cause the processor to:
estimate values of the amount of energy harvested by each of the plurality of devices that is electrically coupled to the control device, and,
when determining whether or not to perform each of the predetermined functions, select one of the plurality of devices that is electrically coupled to the control device based on the values of amount of energy harvested by each of the devices that is electrically coupled to the control device.

8. The control device according to claim 4,
wherein a plurality of devices is electrically coupled to the control device, and
wherein the instructions, when executed by the processor cause the processor to:
estimate values of the amount of energy harvested by each of the plurality of devices that is electrically coupled to the control device, and,
when determining whether or not to perform each of the predetermined functions, select one of the plurality of devices that is electrically coupled to the control device to be used based on the values of the amount of energy harvested by each of the plurality of devices that is electrically coupled to the control device.

9. The control device according to claim 1,
wherein a plurality of devices is electrically coupled to the control device, and
wherein the instructions, when executed by the processor cause the processor to:
acquire values of the amount of energy harvested by each of the plurality of devices that is electrically coupled to the control device and,
based on a data log including values of the amount of energy harvested by each of the plurality of devices that is electrically coupled to the control device acquired at each of a plurality of locations, estimate values of the amount of energy harvested by each of the plurality of devices that is electrically coupled to the control device in each of a plurality of regions that is larger than a corresponding one of the plurality of locations, and,
when determining whether or not to perform each of the predetermined functions, select one of the devices that is electrically coupled to the control device to be used in the predetermined location based on the values of the amount of energy harvested by each of the plurality of devices that is electrically coupled to the control device.

10. The control device according to claim 2, further comprising: a memory storing the data log.

11. The control device according to claim 3, further comprising: a memory storing the data log.

12. The control device according to claim 1, further comprising: a memory storing the data log.

13. The control device according to claim 4, further comprising: a memory storing the data log.

14. The control device according to claim 5, further comprising: a memory storing the data log.

15. A control method of a control device that is electrically coupled to a device, the control method comprising:
performing a plurality of predetermined functions;
acquiring a plurality of electricity consumption amounts required to perform each of the predetermined functions at a time when the predetermined functions are performed;
acquiring an amount of energy harvested by the device that is electrically coupled to the control device, wherein the electricity consumption amounts and the amount of energy harvested correspond to a predetermined location;
acquiring a remaining battery amount of a battery;
estimating values of the electricity consumption amounts, the amount of energy harvested, and the remaining battery amount at the predetermined location using a data log including values of the electricity consumption amounts, the amount of energy harvested, and the remaining battery amount acquired at each of a plurality of locations and associated with each of the plurality of locations, and
controlling performance of each of the predetermined functions in the predetermined location based on the values of the electricity consumption amounts, the amount of energy harvested, and the remaining battery amount that are estimated.

16. A non-transitory recording medium storing a program that is readable by a computer of a control device that is electrically coupled to a device,
wherein the program causes the computer to:
perform a plurality of predetermined functions;
acquire a plurality of electricity consumption amounts required to perform each of the predetermined functions at a time when the predetermined functions are performed;
acquire an amount of energy harvested by the device that is electrically coupled to the control device, wherein the electricity consumption amounts and the amount of energy harvested correspond to a predetermined location;
acquiring a remaining battery amount of a battery;
estimate values of the electricity consumption amounts, the amount of energy harvested, and the remaining battery amount at the predetermined location using a data log including values of the electricity consumption amounts, the amount of energy harvested, and the remaining battery amount acquired at each of a plurality of locations and associated with each of the plurality of locations, and
control performance of each of the predetermined functions in the predetermined location based on the values of the electricity consumption amounts, the amount of energy harvested, and the remaining battery amount that are estimated.

* * * * *